US012607157B2

(12) United States Patent
Cho et al.

(10) Patent No.: US 12,607,157 B2
(45) Date of Patent: Apr. 21, 2026

(54) ROLL CONTROL THRUSTER AND HYBRID ROCKET COMPRISING SAME

(71) Applicant: INNOSPACE CO., LTD., Sejong (KR)

(72) Inventors: Sung Bong Cho, Sejong (KR); Seon Mo Seong, Seoul (KR); Soo Jong Kim, Sejong (KR); Hun Jung, Sejong (KR)

(73) Assignee: INNOSPACE CO., LTD., Sejong-si (KR)

( * ) Notice: Subject to any disclaimer, the term of this patent is extended or adjusted under 35 U.S.C. 154(b) by 0 days.

(21) Appl. No.: 18/898,226

(22) Filed: Sep. 26, 2024

(65) Prior Publication Data

US 2025/0019095 A1 Jan. 16, 2025

Related U.S. Application Data

(63) Continuation of application No. PCT/KR2023/003685, filed on Mar. 21, 2023.

(30) Foreign Application Priority Data

Mar. 28, 2022 (KR) ........................ 10-2022-0038114

(51) Int. Cl.
*F02K 9/72* (2006.01)
*F02K 9/46* (2006.01)
(Continued)

(52) U.S. Cl.
CPC .................. *F02K 9/72* (2013.01); *F02K 9/46* (2013.01); *F02K 9/56* (2013.01); *F02K 9/605* (2013.01); *F02K 9/88* (2013.01)

(58) Field of Classification Search
CPC ..... F02K 9/72; F02K 9/46; F02K 9/56; F02K 9/88; F02K 9/563
See application file for complete search history.

(56) References Cited

U.S. PATENT DOCUMENTS 6,393,830 B1 * 5/2002 Hamke ..................... F02K 9/88
60/229
7,900,434 B2 * 3/2011 Grayson ................... F02K 9/50
60/257

(Continued)

FOREIGN PATENT DOCUMENTS

JP         H06-129302 A     5/1994
JP         H07-23120 B2     3/1995
(Continued)

*Primary Examiner* — Ted Kim
(74) *Attorney, Agent, or Firm* — United One Law Group LLC; Kongsik Kim; Jhongwoo Peck

(57) ABSTRACT

A roll control thruster controls the attitude of a launch vehicle by using the oxidizer filled in an oxidizer tank, and includes: a thruster tank that is charged using a portion of the oxidizer stored in the oxidizer tank; a thruster line that is branched from the thruster tank and forms a supply path of the oxidizer stored in the thruster tank; a thruster valve that is provided in the thruster line and opens and closes the thruster line or adjusts the opening degree of the thruster line; a thruster module that is connected to the thruster line and injects the oxidizer, supplied via the thruster line, in order to control the attitude of the launch vehicle; and a thruster control module that controls the operation of the thruster valve and the supply of oxidizer to the thruster module.

4 Claims, 4 Drawing Sheets

(51) Int. Cl.
     *F02K 9/56*          (2006.01)
     *F02K 9/88*          (2006.01)
     *F02K 9/60*           (2006.01)

(56)           References Cited

U.S. PATENT DOCUMENTS

| | | | |
|---|---|---|---|
| 9,909,574 | B1 * | 3/2018 | Heimanowski ........... F02K 9/97 |
| 10,717,550 | B1 * | 7/2020 | Zegler .................... B64G 1/421 |
| 2005/0229583 | A1 | 10/2005 | Grainger et al. |
| 2012/0227374 | A1 | 9/2012 | Zegler |
| 2014/0203148 | A1 * | 7/2014 | Barthoulot ................ F02K 9/88 |
| | | | 60/221 |
| 2016/0237952 | A1 * | 8/2016 | Caratge ..................... F02K 9/58 |

FOREIGN PATENT DOCUMENTS

| | | | |
|---|---|---|---|
| JP | 2004-044480 A | 2/2004 |
| JP | 2016-527444 A | 9/2016 |
| KR | 10-2002-0013366 A | 2/2002 |
| KR | 10-2101659 B1 | 4/2020 |

* cited by examiner

ROLL CONTROL THRUSTER AND HYBRID ROCKET COMPRISING SAME

CROSS-REFERENCE TO RELATED APPLICATIONS

The present application is a Continuation of International Application No. PCT/KR2023/003685 filed Mar. 21, 2023, which claims priority from Korean Application No. 10-2022-0038114 filed Mar. 28, 2022. The aforementioned applications are incorporated herein by reference in their entireties.

TECHNICAL FIELD

The present disclosure relates to a roll control thruster and a hybrid rocket comprising the same and, more particularly, to a roll control thruster for using a portion of an oxidizer released after being cooled from an electric motor pump as a propellant for the roll control thruster, and a hybrid rocket comprising the same.

RELATED ART

Two types of rocket thrust control methods may be adopted depending on the structure of a main engine. There is a method of controlling the thrust of the main engine by fixing the thrust of the main engine in the direction of a rocket body and using a separate propulsion system for attitude control, and a method of generating a control moment by directly changing the direction of the main engine or an engine nozzle.

For actual implementation, in the former case, each thruster system is required to be built for 3-axis control of pitching, yawing, and rolling, and in the latter case, a driving device for moving the engine and a separate thruster system for controlling a roll axis are required.

Most launch vehicles tend to use the latter, a thrust vector control (TVC) method.

However, a conventional thruster uses, as a propellant, fuel vaporized after cooling the nozzle before injecting fuel (hydrogen and kerosene, etc.) into a combustion chamber, or uses a separate propellant (cold gas such as nitrogen, hydrogen, etc. or hydrazine and hydrogen peroxide, etc.), so the handling of the propellant may not be easy, the configuration of the thruster may be complicated due to the installation of a separate propellant tank and a supply system, and the thruster may be enlarged due to the increase of the size and weight of a launch vehicle.

A prior art includes Korean Patent Application Publication No. 10-2002-0013366 (published on Feb. 20, 2002, invention title: PROPULSION AND CONTROL SYSTEM OF HYBRID ROCKET).

SUMMARY

The present disclosure has been made keeping in mind the above problems occurring in the prior art, and is intended to propose a roll control thruster for using a portion of an oxidizer released after being cooled from an electric motor pump as a propellant for the roll control thruster, and a hybrid rocket comprising the same.

In order to accomplish the objectives of the present disclosure described above, according to an exemplary embodiment, there is provided a roll control thruster according to the present disclosure configured to control an attitude of a launch vehicle by using an oxidizer filled in an oxidizer tank, the roll control thruster including: a thruster tank in which a portion of the oxidizer discharged from the oxidizer tank is filled; a thruster line configured to branch from the thruster tank and form a supply path of the oxidizer filled in the thruster tank; a thruster valve provided in the thruster line and configured to open and close the thruster line or to adjust an opening degree of the thruster line; a thruster module configured to be connected to the thruster line and to spray the oxidizer supplied through the thruster line to control the attitude of the launch vehicle; and a thruster control module configured to control an operation of the thruster valve and supply of the oxidizer to the thruster module.

The roll control thruster according to the present disclosure may further include: a release line configured to branch from the thruster tank by being spaced apart from the thruster line or to branch from the thruster line, with the release line configured to form a release path of the oxidizer filled in the thruster tank; a relief valve provided in the release line and configured to prevent pressure acting on the release line from rising to a specified pressure or more; and a release valve provided in the release line between the thruster tank and the relief valve and configured to open and close the release line or to adjust the opening degree of the release line according to the control of the thruster control module.

The roll control thruster according to the present disclosure may further include: a heat exchange module configured to heat or cool the oxidizer filled in the thruster tank according to the control of the thruster control module.

The roll control thruster according to the present disclosure may further include: at least an oxidizer supply unit among the oxidizer supply unit configured to pump the oxidizer filled in the oxidizer tank and to transfer the oxidizer to a combustion chamber which generates thrust of the launch vehicle, and a transfer line configured to connect the oxidizer supply unit with the thruster tank.

As a first example, the oxidizer supply unit may include: an oxidizer pump configured to pump an oxidizer filled into the oxidizer tank from an outside of the oxidizer tank; an electric motor configured to operate the oxidizer pump according to application of power; a battery configured to power the electric motor; an oxidizer line configured to connect the oxidizer tank with the oxidizer pump; a discharge line configured to connect the oxidizer pump with the combustion chamber; and a thruster branch module configured to branch from the oxidizer line and to be connected to the thruster tank or the transfer line.

As a second example, the oxidizer supply unit may include: an oxidizer pump configured to pump an oxidizer filled into the oxidizer tank from an outside of the oxidizer tank; an electric motor configured to operate the oxidizer pump according to supplying of power; a battery configured to power the electric motor; an oxidizer line configured to connect the oxidizer tank with the oxidizer pump; a discharge line configured to connect the oxidizer pump with the combustion chamber; a heat dissipation module configured to branch from the oxidizer line and to dissipate heat from the electric motor and the battery with the oxidizer; and a thruster branch module configured to branch from the heat dissipation module and to be connected to the thruster tank or the transfer line.

As a third example, the oxidizer supply unit may include: an oxidizer pump configured to pump the oxidizer filled in the oxidizer tank; an electric motor configured to operate the oxidizer pump according to supplying of power; a battery configured to power the electric motor; an intake line configured to connect the oxidizer tank with the oxidizer pump; a discharge line configured to connect the oxidizer pump with the combustion chamber; and a thruster branch module configured to branch from the intake line and to be connected to the thruster tank or the transfer line, wherein among the oxidizer pump, the electric motor, and the battery, at least the electric motor may be mounted inside the oxidizer tank.

As a fourth example, the oxidizer supply unit may include: an oxidizer pump configured to pump the oxidizer filled in the oxidizer tank; an electric motor configured to operate the oxidizer pump according to supplying of power; a battery configured to power the electric motor; an intake line configured to connect the oxidizer tank with the oxidizer pump; a discharge line configured to connect the oxidizer pump with the combustion chamber; a heat dissipation module configured to branch from the intake line and to dissipate heat from the electric motor with an oxidizer; and a thruster branch module configured to branch from the heat dissipation module and to be connected to the thruster tank or the transfer line, wherein among the oxidizer pump, the electric motor, and the battery, at least the electric motor may be mounted inside the oxidizer tank.

The roll control thruster according to the present disclosure may further include: a thruster tank pumping module configured to be provided in the transfer line and to pump an oxidizer of the transfer line according to supplying of power.

A hybrid rocket according to the present disclosure includes: a fuselage constituting an exterior thereof; an oxidizer tank mounted in the fuselage, with an oxidizer filled in the oxidizer tank; a combustion chamber configured to use the oxidizer supplied from the oxidizer tank to burn solid fuel stored therein; and a thruster unit configured to control an attitude of a launch vehicle by using the oxidizer filled in the oxidizer tank, wherein the thruster unit includes the roll control thruster according to the present disclosure.

According to the roll control thruster and the hybrid rocket comprising the same according to the present disclosure, it is possible to use a portion of an oxidizer released after being cooled from an electric motor pump as a propellant for the roll control thruster.

In addition, according to the present disclosure, since there is no need to mount additional fuel and containers to generate thrust for roll control, it is possible to prevent the size and weight of the launch vehicle from increasing and configure the launch vehicle to be compact.

In addition, according to the present disclosure, through the detailed coupling relationship of the release line, it is possible to safely discharge an unnecessary oxidizer in the thruster tank to the outside of the launch vehicle.

In addition, according to the present disclosure, through the coupling relationship of the heat exchange module, it is possible to adjust pressure and temperature within the thruster tank and to easily provide pressure required for the thruster module.

In addition, according to the present disclosure, through the additional coupling relationship of the oxidizer supply unit, it is possible to efficiently separate an oxidizer used as a propellant of the roll control thruster and to facilitate the supply of the oxidizer to the combustion chamber.

In addition, according to the present disclosure, through the detailed coupling relationship of the oxidizer supply unit in which the oxidizer pump and the electric motor are disposed outside the oxidizer tank, it is possible to stably extract an oxidizer used as a propellant of the roll control thruster from the oxidizer supply unit and to facilitate the supply of the oxidizer to the combustion chamber.

In addition, according to the present disclosure, through the detailed coupling relationship of the oxidizer supply unit having at least the electric motor of the oxidizer pump and the electric motor mounted in the oxidizer tank, it is possible to stably extract an oxidizer used as a propellant of the roll control thruster from the oxidizer supply unit and to facilitate the supply of the oxidizer to the combustion chamber.

In addition, according to the present disclosure, through the additional configuration of the transfer line, it is possible to stably transfer an extracted oxidizer through the thruster branch module to the thruster tank.

In addition, according to the present disclosure, through the coupling relationship of the thruster tank pumping module, it is possible to add pressure to the oxidizer of the transfer line and facilitate the supply of the oxidizer to the thruster tank.

In addition, there are oxidizer charging and cooling procedures before the actual launch of the launch vehicle, and a preliminary cooling procedure for the oxidizer supply unit according to the present disclosure is required to be performed from the oxidizer tank to the combustion chamber. Accordingly, when the electric motor and the oxidizer pump are mounted inside the oxidizer tank, the cooling of the intake line or the oxidizer line, the oxidizer pump, the connection line, and a portion of the discharge line included in the oxidizer supply unit is not required, so it is possible to simplify the pre-launch oxidizer charging and cooling procedures of the launch vehicle and to shorten the cooling time of the oxidizer supply unit.

DETAILED DESCRIPTION

Figure 1:
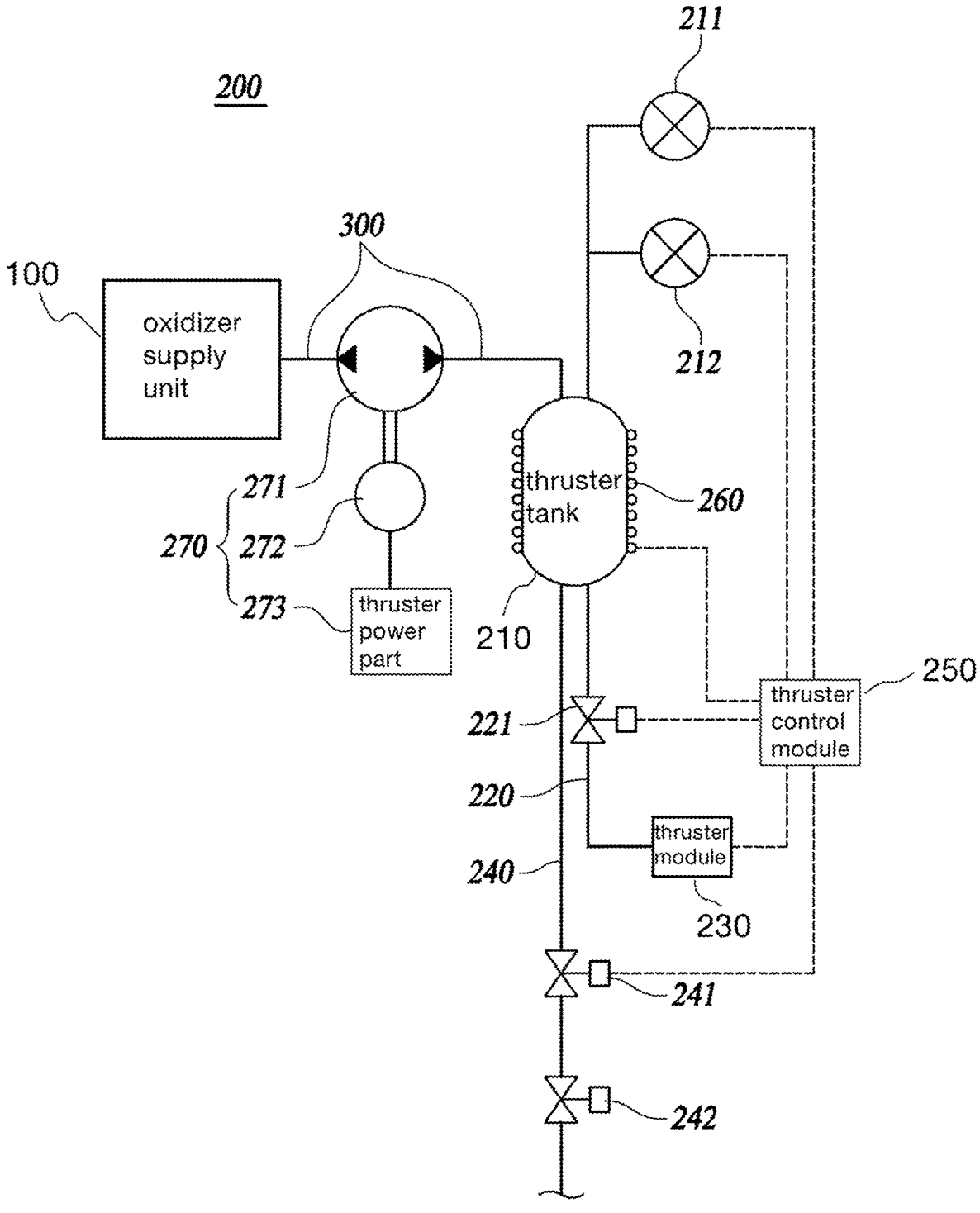
FIG. 1 is a diagram illustrating a roll control thruster according to an embodiment of the present disclosure.

Hereinafter, an embodiment of a roll control thruster and a hybrid rocket comprising the same according to the present disclosure will be described with reference to the accompanying drawings. In this case, the present disclosure is not restricted or limited by the embodiment. In addition, when describing the present disclosure, detailed descriptions of known functions or configurations may be omitted to make the gist of the present disclosure clear.

Referring to FIGS. 1 to 4, the hybrid rocket according to an embodiment of the present disclosure may include a fuselage 10 constituting an exterior thereof, an oxidizer tank 20 mounted in the fuselage 10, with an oxidizer filled in the oxidizer tank 20, a combustion chamber 30 that uses the oxidizer supplied from the oxidizer tank 20 to burn solid fuel stored therein, and a thruster unit 200 that controls the attitude of a launch vehicle by using the oxidizer filled in the oxidizer tank 20.

The fuselage 10 constitutes the exterior of the hybrid rocket which is the launch vehicle, and may be designed and manufactured to be compact by the coupling relationship of the oxidizer tank 20 and an oxidizer supply unit 100.

A liquid cryogenic oxidizer is filled in the oxidizer tank 20. The oxidizer tank 20 may be provided with a pressure sensor 21 that senses internal pressure. The pressure sensor 21 may monitor the sensing value of the pressure sensor 21 by a pumping control module 170, which will be described later.

The thruster unit 200 may include the roll control thruster according to an embodiment of the present disclosure. The roll control thruster in the embodiment of the present disclosure is described as being applied to the hybrid rocket, but is not limited thereto. The roll control thruster according to the embodiment of the present disclosure may control the attitude of the launch vehicle by using an oxidizer filled in the oxidizer tank 20 in various known launch vehicle s.

The roll control thruster according to the embodiment of the present disclosure controls the attitude of the launch vehicle by using an oxidizer filled in the oxidizer tank 20.

The roll control thruster according to the embodiment of the present disclosure may include a thruster tank 210, a thruster line 220, a thruster valve 221, a thruster module 230, and a thruster control module 250.

The thruster tank 210 is filled with a portion of an oxidizer released from the oxidizer tank 20. The thruster tank 210 may be provided with a pressure sensing part 211 that senses internal pressure. The pressure sensing part 211 may monitor the sensing value of the pressure sensing part 211 by the thruster control module 250. The thruster tank 210 may be provided with a temperature sensing part 212 that senses an internal temperature thereof. The temperature sensing part 212 may monitor the sensing value of the temperature sensing part 212 by the thruster control module 250.

The thruster line 220 branches from the thruster tank 210. The thruster line 220 forms a supply path for an oxidizer filled in the thruster tank 210.

The thruster valve 221 is provided in the thruster line 220. The thruster valve 221 opens and closes the thruster line 220 or adjusts the opening degree of the thruster line 220. The thruster valve 221 is controlled by the thruster control module 250.

The thruster module 230 is connected to the thruster line 22. The thruster module 230 sprays an oxidizer supplied through the thruster line 220 to control the attitude of the launch vehicle.

The thruster control module 250 controls the operation of the thruster valve 221 and the supply of an oxidizer to the thruster module 230. The thruster control module 250 may monitor the sensing value of the pressure sensing part 211 and the sensing value of a temperature control part. The thruster control module 250 may control the operation of a heat exchange module 260 to be described later in response to the sensing value of the pressure sensing part 211 and the sensing value of the temperature control part. The thruster control module 250 may control the operation of a thruster tank pumping module 270 to be described later in response to the pressure and capacity of an oxidizer filled in the thruster tank 210.

The roll control thruster according to an embodiment of the present disclosure may further include a release line 240 that branches from the thruster tank 210 by being spaced apart from the thruster line 220 or branches from the thruster line 220, with the release line 240 configured to form a release path of the oxidizer filled in the thruster tank 210, a relief valve 242 provided in the release line 240 to prevent pressure acting on the release line 240 from rising to specified pressure or more, and a release valve 241 that is provided in the release line 240 between the thruster tank 210 and the relief valve 242 and opens and closes the release line 240 or adjusts the opening degree of the release line 240 according to the control of the thruster control module 250.

The roll control thruster according to an embodiment of the present disclosure may further include the heat exchange module 260 which heats or cools an oxidizer filled in the thruster tank 210 according to the control of the thruster control module 250. The heat exchange module 260 may include a thermoelectric element that implements an endothermic operation or an exothermic operation of an oxidizer filled in the thruster tank 210 through a thermoelectric effect representing the interaction of heat and electricity according to the supplying of the power of a battery 140 or the power of a thruster power part 273 to be described later.

The roll control thruster according to an embodiment of the present disclosure may further include at least one oxidizer supply unit 100 that pumps an oxidizer filled in the oxidizer tank 20 and transfers the oxidizer to the combustion chamber 30 configured to generate the thrust of the launch vehicle, and a transfer line 300 that connects the oxidizer supply unit 100 with the thruster tank 210.

The oxidizer supply unit 100 releases an oxidizer filled in the oxidizer tank 20.

The oxidizer supply unit 100 may be divided into an external-type oxidizer supply unit and an internal-type oxidizer supply unit.

A heat dissipation branch line 161 may be connected to the transfer line 300.

Figure 2:
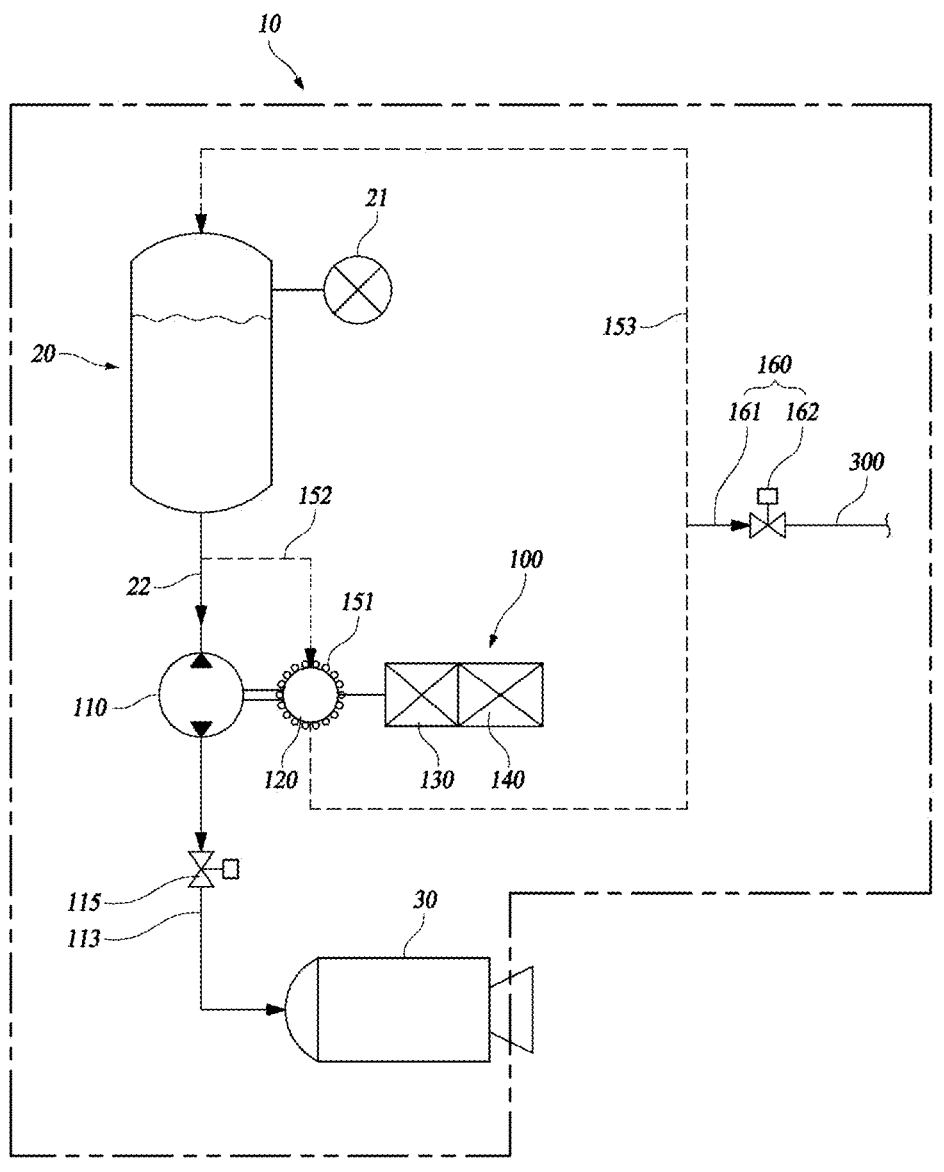
FIG. 2 is a diagram illustrating a hybrid rocket equipped with the roll control thruster according to an embodiment of the present disclosure.

For example, as illustrated in FIG. 2, an external-type oxidizer supply unit 100 may include an oxidizer pump 110 which pumps an oxidizer filled into the oxidizer tank 20 from the outside of the oxidizer tank 20, an electric motor 120 which operates the oxidizer pump 110 according to the supplying of power of the battery 140, the battery 140 which powers the electric motor 120, an oxidizer line 22 which connects the oxidizer tank 20 with the oxidizer pump 110, a discharge line 113 which connects the oxidizer pump 110 with the combustion chamber 30, and a thruster branch module 160 which branches from the oxidizer line 22 and is connected to the thruster tank 210 or the transfer line 300.

For another example, as illustrated in FIG. 2, the external-type oxidizer supply unit 100 may include the oxidizer pump 110 which pumps an oxidizer filled into the oxidizer tank 20 from the outside of the oxidizer tank 20, the electric motor 120 which operates the oxidizer pump 110 according to the supplying of power of the battery 140, the battery 140 which powers the electric motor 120, the oxidizer line 22 which connects the oxidizer tank 20 with the oxidizer pump 110, the discharge line 113 which connects the oxidizer pump 110 with the combustion chamber 30, a heat dissipation module which branches from the oxidizer line 22 and dissipates heat from the electric motor 120 and the battery 140, and the thruster branch module 160 which branches from the heat dissipation module and is connected to the thruster tank 210 or the transfer line 300.

The oxidizer pump 110 and the electric motor 120 are disposed outside the oxidizer tank 20.

The electric motor 120 is controlled by the pumping control module 170 to be described later.

Here, the external-type oxidizer supply unit 100 may further include a discharge valve 115 provided in the discharge line 113. The discharge valve 115 may open and close the discharge line 113 or adjust the opening degree of the discharge line 113. The discharge valve 115 is controlled by the pumping control module 170 to be described later.

The battery 140 in the external-type oxidizer supply unit 100 may be coupled to the outer peripheral surface of the oxidizer tank 20. In this case, it is possible to prevent contact of the battery 140 with an oxidizer due to malfunction, damage, or power leakage of the battery 140, and prevent accidents such as explosion of the battery 140. The battery 140 may monitor the status of the battery 140 by the pumping control module 170, which will be described later.

In addition, the thruster branch module 160 branching from the oxidizer line 22 may include the heat dissipation branch line 161 which branches from the oxidizer line 22 and is connected to the thruster tank 210 or the transfer line 300, and a heat dissipation branch valve 162 which is provided in the heat dissipation branch line 161 and opens and closes the heat dissipation branch line 161 or adjusts the opening degree of the heat dissipation branch line 161. The heat dissipation branch valve 162 is controlled by the pumping control module 170 to be described later.

In addition, the heat dissipation module may include a motor heat dissipation line 151 which surrounds the electric motor 120 and the battery 140, a supply line 152 which connects a first end portion of the motor heat dissipation line 151 with the oxidizer line 22 or the discharge line 113, and a recovery line 153 connected to a second end portion of the motor heat dissipation line 151. For example, the recovery line 153 is connected to the upper end portion of the oxidizer tank 20, allowing an oxidizer to be recovered into the oxidizer tank 20. For another example, the recovery line 153 has a free end portion connected to the thruster branch module 160, allowing an oxidizer to be transferred to the thruster tank 210.

In addition, the thruster branch module 160 branching from the heat dissipation module may include the heat dissipation branch line 161 which branches from any one of the lines of the heat dissipation module, and the heat dissipation branch valve 162 which is provided in the heat dissipation branch line 161 and opens and closes the heat dissipation branch line 161 or adjusts the opening degree of the heat dissipation branch line 161. The heat dissipation branch valve 162 is controlled by the pumping control module 170 to be described later.

Figure 3:
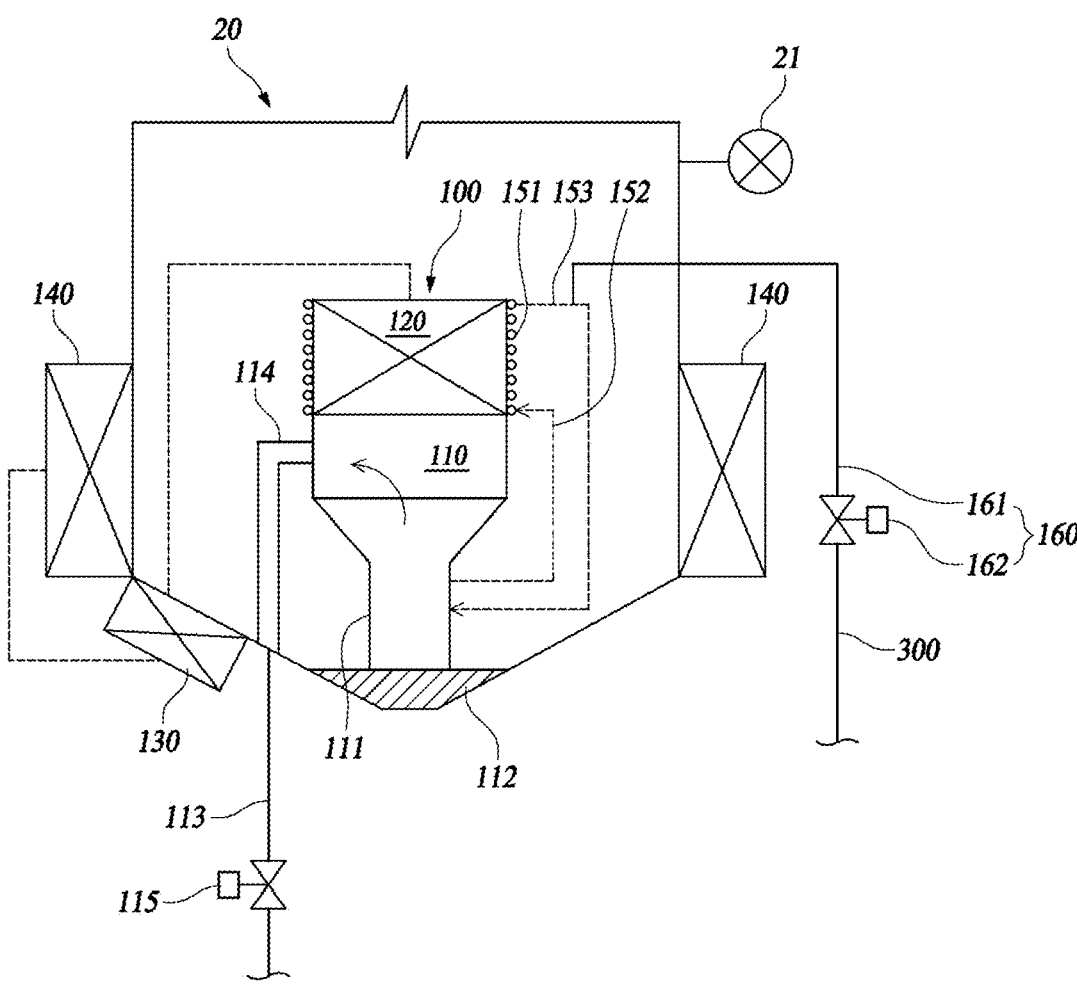
FIG. 3 is a diagram illustrating a modified example of an oxidizer supply unit in the hybrid rocket equipped with the roll control thruster according to an embodiment of the present disclosure.
Figure 4:
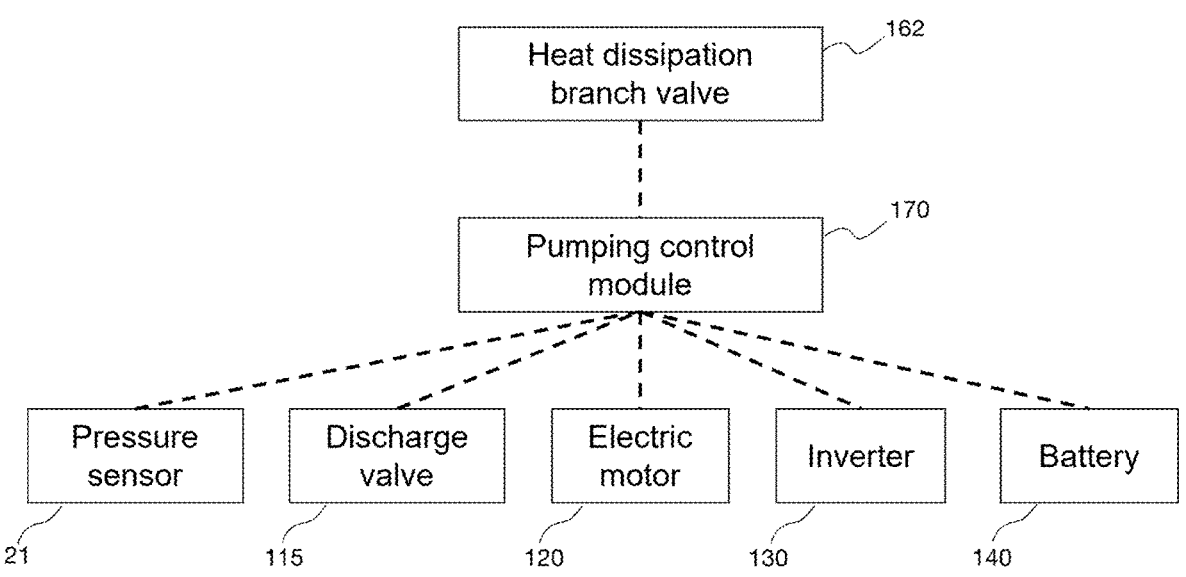
FIG. 4 is a diagram illustrating a coupling relationship between the oxidizer supply unit and a pumping control module in the hybrid rocket equipped with the roll control thruster according to an embodiment of the present disclosure.

For example, as illustrated in FIG. 3, an internal-type oxidizer supply unit 100 may include the oxidizer pump 110 which pumps an oxidizer filled in the oxidizer tank 20, the electric motor 120 which operates the oxidizer pump 110 according to the supplying of power of the battery 140, the battery 140 which powers the electric motor 120, an intake line 111 which connects the oxidizer tank 20 with the oxidizer pump 110, the discharge line 113 which connects the oxidizer pump 110 with the combustion chamber 30, and the thruster branch module 160 which branches from the intake line 111 and is connected to the thruster tank 210 or the transfer line 300. In this case, among the oxidizer pump 110, the electric motor 120, and the battery 140, at least the electric motor 120 is mounted inside the oxidizer tank 20.

For another example, as illustrated in FIG. 3, the internal-type oxidizer supply unit 100 may include the oxidizer pump 110 which pumps an oxidizer filled in the oxidizer tank 20, the electric motor 120 which operates the oxidizer pump 110 according to the supplying of power of the battery 140, the battery 140 which powers the electric motor 120, the intake line 111 which connects the oxidizer tank 20 with the oxidizer pump 110, the discharge line 113 which connects the oxidizer pump 110 with the combustion chamber 30, the heat dissipation module which branches from the intake line

111 and dissipates heat from the electric motor 120 with an oxidizer, and the thruster branch module 160 which branches from the heat dissipation module and is connected to the thruster tank 210 or the transfer line 300. In this case, among the oxidizer pump 110, the electric motor 120, and the battery 140, at least the electric motor 120 is mounted inside the oxidizer tank 20.

Even if at least the electric motor 120 among the oxidizer pump 110, the electric motor 120, and the battery 140 is mounted inside the oxidizer tank 20, the capacity of an oxidizer filled in the oxidizer tank 20 is substantially the same as that of an oxidizer filled in the conventional oxidizer tank. In this case, the fact that a component is mounted in the oxidizer tank 20 may indicate that the component is in direct contact with or immersed in an oxidizer inside the oxidizer tank 20, or that the component is accommodated in a space separately provided inside the oxidizer tank 20.

The electric motor 120 is controlled by the pumping control module 170 to be described later.

The internal-type oxidizer supply unit 100 may further include the discharge valve 115 provided in the discharge line 113. The discharge valve 115 may open and close the discharge line 113 or adjust the opening degree of the discharge line 113. The discharge valve 115 is controlled by the pumping control module 170 to be described later.

Since the battery 140 in the internal-type oxidizer supply unit 100 is coupled to the outer peripheral surface of the oxidizer tank 20, it is possible to prevent contact of the battery 140 with an oxidizer due to malfunction, damage, or power leakage of the battery 140, and prevent accidents such as explosion of the battery 140. The battery 140 may monitor the status of the battery 140 by the pumping control module 170, which will be described later.

Both the oxidizer pump 110 and the electric motor 120 in the internal-type oxidizer supply unit 100 may be mounted inside the oxidizer tank 20, and the internal-type oxidizer supply unit 100 may further include a connection line 114.

While the intake line 111 in the internal-type oxidizer supply unit 100 is mounted in the oxidizer tank 20, the intake line 111 is connected to the oxidizer pump 110. The intake line 111 forms a path for supplying an oxidizer filled in the oxidizer tank 20 to the oxidizer pump 110. A passage part through which the oxidizer filled in the oxidizer tank 20 passes is provided between the intake line 111 and the oxidizer tank 20.

The discharge line 113 in the internal-type oxidizer supply unit 100 connects the oxidizer tank 20 with the combustion chamber 30. The discharge line 113 forms a path for supplying an oxidizer to the combustion chamber 30. The discharge line 113 forms the path for supplying an oxidizer filled in the oxidizer tank 20 to the combustion chamber 30.

The connection line 114 in the internal-type oxidizer supply unit 100 connects the oxidizer pump 110 with the discharge line 113. The connection line 114 forms a path for releasing an oxidizer to the discharge line 113. In this case, a portion of the connection line 114 may be mounted inside the intake line 111. One connection line 114 may branch from the side portion of the oxidizer pump 110. Since the connection line 114 extends in a tangential direction from the side portion of the discharge line 113, an oxidizer may be stably supplied to the discharge line 113 and the impact of the oxidizer on the discharge line 113 may be alleviated. Since the connection line 114 extends in a tangential direction from the side portion of the oxidizer pump 110, the discharge of an oxidizer from the oxidizer pump 110 may be stabilized and the impact of the oxidizer on the connection line 114 may be alleviated.

Although not shown, one pair of connection lines 114 in the internal-type oxidizer supply unit 100 may branch to face each other from the side portion of the oxidizer pump 110. The connection lines 114 may include a first line which branches from the side portion of the oxidizer pump 110 and is connected to the discharge line 113, and a second line which branches from the side portion of the oxidizer pump 110 to face the branching portion of the first line and is connected to the discharge line 113.

The heat dissipation module may include the motor heat dissipation line 151 which surrounds the electric motor 120, the supply line 152 which connects the first end portion of the motor heat dissipation line 151 with the connection line 114 or the first end portion of the motor heat dissipation line 151 with the intake line 111, and the recovery line 153 which is connected to the second end portion of the motor heat dissipation line 151. For example, the recovery line 153 may be connected to the supply line 152 to recover an oxidizer. For another example, the recovery line 153 has the free end portion disposed inside the oxidizer tank 20 allowing an oxidizer to be discharged to the inside of the oxidizer tank 20.

The thruster branch module 160 branching from the heat dissipation module may include the heat dissipation branch line 161 which branches from any one of the lines of the heat dissipation module, and the heat dissipation branch valve 162 which is provided in the heat dissipation branch line 161 and opens and closes the heat dissipation branch line 161 or adjusts the opening degree of the heat dissipation branch line 161. The heat dissipation branch valve 162 is controlled by the pumping control module 170 to be described later.

Although not shown, while the electric motor 120 is mounted inside the oxidizer tank 20, the oxidizer pump 110 may be disposed outside the oxidizer tank 20, and the internal-type oxidizer supply unit 100 may include the intake line 111, and the discharge line 113. The intake line 111 connects the oxidizer tank 20 with the oxidizer pump 110. The intake line 111 forms a path for supplying an oxidizer to the oxidizer pump 110. The discharge line 113 connects the oxidizer pump 110 with the combustion chamber 30. The discharge line 113 forms a path for supplying an oxidizer to the combustion chamber 30.

Although not shown, the heat dissipation module may be provided in at least any one of the supply line 152 and the recovery line 153, and may further include a heat dissipation valve which opens and closes the corresponding line or adjusts the opening degree of the corresponding line. The heat dissipation valve is controlled by the pumping control module 170 to be described later.

The internal-type oxidizer supply unit 100 may be provided at the inlet side of the intake line 111 at the lower portion of the oxidizer tank 20, and may further include an intake support member 112 which stabilizes an oxidizer introduced into the intake line 111. Since the intake support member 112 is disposed at the lower center of the oxidizer tank 20, it is possible to prevent a liquid cryogenic oxidizer from sloshing inside the oxidizer tank 20 and to stably transfer the oxidizer to the intake line 111.

The internal-type oxidizer supply unit 100 may further include an inverter 130 which controls the electric motor 120 by using power of the battery 140. In addition, since the inverter 130 is coupled to the outer peripheral surface of the oxidizer tank 20, heat dissipation of the inverter 130 may be facilitated. Since the inverter 130 is coupled to the outer peripheral surface of the oxidizer tank 20, it is possible to prevent contact of the inverter 130 with an oxidizer due to malfunction, damage, or power leakage of the inverter 130, and prevent accidents such as explosion of the inverter 130. The operation of the inverter 130 is controlled by the pumping control module 170 to be described later.

The internal-type oxidizer supply unit 100 may further include the pumping control module 170 which controls the electric motor 120, the inverter 130, the discharge valve 115, the heat dissipation valve, and the heat dissipation branch valve 162 to interoperate with each other. The pumping control module may monitor the status of the battery 140 and the sensing value of the pressure sensor 21.

Since the pumping control module 170 controls the electric motor 120 and the valves to interoperate with each other in response to the supply of an oxidizer to the combustion chamber 30, it is possible to ensure the stable supply of an oxidizer to the combustion chamber 30, and the supply of a correct amount of an oxidizer.

The roll control thruster according to an embodiment of the present disclosure may further include the thruster tank pumping module 270 which is provided in the transfer line 300 and pumps the oxidizer of the transfer line 300 according to the supplying of power of the thruster power part 273.

The thruster tank pumping module 270 may include a thruster pump 271 which is provided in the transfer line 300 and pumps the oxidizer of the transfer line 300, a thruster motor 272 which operates the thruster pump 271 according to the supplying of power of the thruster power part 273, and the thruster power part 273 which applies power to the thruster motor 272. Although not shown, the thruster tank pumping module 270 may further include a thruster inverter which controls the thruster motor 272 by using power from the thruster power part 273.

Since the combustion chamber 30 is supplied with an oxidizer, solid fuel stored therein is burned.

The combustion chamber 30 may be provided with an ignition device and a thrust nozzle that is exposed to the outside of the fuselage 10 and through which combustion substances are discharged.

The hybrid rocket according to an embodiment of the present disclosure further includes an injector that sprays an oxidizer discharged through the discharge line 113 to the combustion chamber 30, so that the oxidizer may be stably supplied to the combustion chamber 30.

According to the roll control thruster and the hybrid rocket comprising the same described above, it is possible to use a portion of an oxidizer released after being cooled from the electric motor pump as a propellant for the roll control thruster.

In addition, since there is no need to mount separate fuel and containers to generate thrust for roll control, it is possible to prevent the size and weight of the launch vehicle from increasing and configure the launch vehicle to be compact.

In addition, through the detailed coupling relationship of the release line 240, it is possible to safely discharge an unnecessary oxidizer in the thruster tank 210 to the outside of the launch vehicle.

In addition, through the coupling relationship of the heat exchange module 260, it is possible to adjust pressure and temperature within the thruster tank 210 and to easily provide pressure required for the thruster module 230.

In addition, through the additional coupling relationship of the oxidizer supply unit 100, it is possible to efficiently separate an oxidizer used as a propellant and to facilitate the supply of the oxidizer to the combustion chamber 30.

In addition, through the detailed coupling relationship of the oxidizer supply unit 100 in which the oxidizer pump 110 and the electric motor 120 are disposed outside the oxidizer tank 20, it is possible to stably extract an oxidizer used as a propellant from the oxidizer supply unit 100 and to facilitate the supply of the oxidizer to the combustion chamber 30.

In addition, through the detailed coupling relationship of the oxidizer supply unit 100 having at least the electric motor 120 of the oxidizer pump 110 and the electric motor 120 mounted in the oxidizer tank 20, it is possible to stably extract an oxidizer used as a propellant from the oxidizer supply unit 100 and to facilitate the supply of the oxidizer to the combustion chamber 30.

In addition, through the additional configuration of the transfer line 300, it is possible to stably transfer an extracted oxidizer through the thruster branch module 160 to the thruster tank 210.

In addition, through the coupling relationship of the thruster tank pumping module 270, it is possible to add pressure to the oxidizer of the transfer line 300 and facilitate the supply of the oxidizer to the thruster tank 210.

In addition, through the coupling relationship of the external-type oxidizer supply unit 100 provided in the hybrid rocket, a low-temperature oxidizer cools the electric motor 120 and the battery 140 which are overheated and a sudden pressure decrease in the oxidizer tank 20 is prevented by using pressure generated by vaporization, thus maintaining the transfer pressure of the oxidizer pump 110 constant and enabling the stable supply of an oxidizer.

In addition, by driving the oxidizer pump 110 and supplying an oxidizer by using the electric motor 120 and the battery 140, a pressurization system is simplified and the weight of the oxidizer tank is reduced, thereby maximizing the advantage of the roll control thruster as a launch vehicle propulsion system.

In addition, it is possible to cool an electric drive part including the electric motor 120 and the battery 140 by circulating a low-temperature oxidizer to the electric drive part including the electric motor 120 and the battery 140.

In addition, it is possible to prevent the pressing force of an oxidizer from decreasing by maintaining the pressure of the oxidizer tank constant.

In addition, through the hybrid rocket equipped with an internal-type oxidizer supply device, it is possible to easily dissipate heat of the electric motor 120 and the battery 140 when supplying an oxidizer filled in the oxidizer tank 20 "mounted in the launch vehicle to the combustion chamber 30.

In addition, according to the present disclosure, through the arrangement structure of the oxidizer pump 110, the electric motor 120, and the battery 140, it is possible to design and manufacture the launch vehicle by reducing the size and weight of the launch vehicle for application thereof and improve the heat dissipation performance of the electric motor 120 that rotates at high speed.

In addition, through the structure of the heat dissipation of the electric motor 120 caused by a cryogenic oxidizer inside the oxidizer tank 20 even without a separate means of heat dissipation, it is possible to stabilize heat dissipation of the electric motor 120 inside the oxidizer tank 20, and due to the relative heating effect of an oxidizer according to the heat dissipation of the electric motor 120, it is possible to increase the discharge pressure of the oxidizer and facilitate the supply of the oxidizer to the combustion chamber 30.

In addition, by adopting a method of discharging an oxidizer to the lower position of the oxidizer tank 20, it is possible to stably discharge a liquid oxidizer.

In addition, through the arrangement of the battery 140, it is possible to prevent accidents caused by power leakage of the battery 140.

In addition, through the coupling relationship of the intake line 111, the discharge line 113, and the connection line 114, it is possible to easily perform the intake and discharge of an oxidizer inside the oxidizer tank 20 and improve the coupling stability of the oxidizer supply unit 100.

In addition, through the coupling relationship of the intake line 111 and the discharge line 113, it is possible to easily perform the intake and discharge of an oxidizer outside the oxidizer tank 20 and improve the coupling stability of the oxidizer supply unit 100.

In addition, through the coupling relationship of the intake support member 112, it is possible to facilitate the intake of an oxidizer at the lower position of the oxidizer tank 20 and prevent a vortex caused by the intake of the oxidizer.

In addition, through the coupling relationship of the heat dissipation module, it is possible to ensure the heat dissipation of the electric motor 120 which operates for the discharge of an oxidizer inside the oxidizer tank 20.

In addition, through the coupling relationship of the thruster branch module 160 in the heat dissipation module, it is possible to use an oxidizer used for heat dissipation as a propellant for the operation of the thruster that controls the attitude of the launch vehicle or to facilitate the discharge of an oxidizer used for heat dissipation.

In addition, through the coupling relationship of the inverter 130, it is possible to control the electric motor 120 by using power of the battery 140.

In addition, through the detailed coupling relationship of the hybrid rocket, it is possible to reduce space occupied by the oxidizer pump 110 and the electric motor 120 inside the launch vehicle and to design and manufacture the launch vehicle to be compact by omitting a piping which connects the oxidizer tank 20 with the oxidizer pump 110.

In addition, through the coupling relationship of the injector, it is possible to stably spray an oxidizer supplied by the oxidizer supply unit 100 to the combustion chamber 30.

In addition, through the detailed coupling relationship of the oxidizer supply unit 100, it is possible to apply the roll control thruster to various launch vehicles which supply an oxidizer to the combustion chamber 30 as well as the hybrid rocket.

In addition, there are oxidizer charging and cooling procedures before the actual launch of the launch vehicle, and a preliminary cooling procedure for the oxidizer supply unit according to the present disclosure is required to be performed from the oxidizer tank 20 to the combustion chamber 30. Accordingly, when the electric motor 120 and the oxidizer pump 110 are mounted inside the oxidizer tank 20, the cooling of the intake line 111 or the oxidizer line 22, the oxidizer pump 110, the connection line 114, and a portion of the discharge line 113 included in the oxidizer supply unit is not required, so it is possible to simplify the pre-launch oxidizer charging and cooling procedures of the launch vehicle and to shorten the cooling time of the oxidizer supply unit.

As described above, the exemplary embodiments of the present disclosure have been described with reference to the drawings, but those skilled in the art may variously modify or change the embodiments within the scope of the spirit and scope of the present disclosure as set forth in the claims below.

DESCRIPTION OF THE REFERENCE NUMERALS IN THE DRAWINGS

10: Fuselage
20: Oxidizer tank

21: Pressure sensor
22: Oxidizer line
30: Combustion chamber
100: Oxidizer supply unit
110: Oxidizer pump
111: Intake line
112: Intake support member
113: Discharge line
114: Connection line
115: Discharge valve
120: Electric motor
130: Inverter
140: Battery
151: Motor heat dissipation line
152: Supply line
153: Recovery line
160: Thruster branch module
161: Heat dissipation branch line
162: Heat dissipation branch valve
170: Pumping control module
200: Thruster unit
210: Thruster tank
211: Pressure sensing part
212: Temperature sensing part
220: Thruster line
221: Thruster valve
230: Thruster module
240: Release line
241: Release valve
242: Relief valve
250: Thruster control module
260: Heat exchange module
270: Thruster tank pumping module
271: Thruster pump
272: Thruster motor
273: Thruster power part
300: Transfer line

What is claimed is:

1. A roll control thruster configured to control an attitude of a launch vehicle by using an oxidizer filled in an oxidizer tank, the roll control thruster comprising:

a thruster tank in which a portion of the oxidizer stored in the oxidizer tank is used and filled;

a thruster line configured to branch from the thruster tank and form a supply path of the oxidizer filled in the thruster tank;

a thruster valve provided in the thruster line and configured to open and close the thruster line or to adjust an opening degree of the thruster line;

a thruster module configured to be connected to the thruster line and to spray the oxidizer supplied through the thruster line to control the attitude of the launch vehicle;

a thruster control module configured to control an operation of the thruster valve and supply of the oxidizer to the thruster module;

at least one oxidizer supply unit configured to pump the oxidizer filled in the oxidizer tank and to transfer the oxidizer to a combustion chamber which generates thrust of the launch vehicle;

a transfer line configured to connect the oxidizer supply unit with the thruster tank;

a thruster tank pumping module configured to be provided in the transfer line and to pump oxidizer of the transfer line, the thruster tank pumping module being driven by a thruster motor, wherein the oxidizer supply unit comprises:

an oxidizer pump configured to pump an oxidizer filled into the oxidizer tank from an outside of the oxidizer tank;

an electric motor configured to operate the oxidizer pump, the electric motor being electrically coupled to a battery;

the battery configured to supply power to the electric motor;

an oxidizer line configured to connect the oxidizer tank with the oxidizer pump;

a discharge line configured to connect the oxidizer pump with the combustion chamber such that pressurized oxidizer is combusted in the combustion chamber;

a heat dissipation module configured to branch from the oxidizer line upstream of the oxidizer pump and to dissipate heat from the electric motor and the battery with the oxidizer; and a thruster branch module configured to branch from the heat dissipation module and to be connected to the thruster tank through the transfer line.

2. The roll control thruster of claim 1, further comprising:

a release line configured to branch from the thruster tank by being spaced apart from the thruster line or to branch from the thruster line, with the release line configured to form a release path of the oxidizer filled in the thruster tank;

a relief valve provided in the release line and configured to prevent pressure acting on the release line from rising to a specified pressure or more; and a release valve provided in the release line between the thruster tank and the relief valve and configured to open and close the release line or to adjust the opening degree of the release line under the control of the thruster control module.

3. The roll control thruster of claim 1, further comprising:

a heat exchange module configured to heat or cool the oxidizer filled in the thruster tank under the control of the thruster control module.

4. A hybrid rocket comprising:

a fuselage constituting an exterior thereof;

the oxidizer tank mounted in the fuselage, with the oxidizer filled in the oxidizer tank;

the combustion chamber configured to use the oxidizer supplied from the oxidizer tank to burn solid fuel stored therein; and the thruster unit configured to control an attitude of the launch vehicle by using the oxidizer filled in the oxidizer tank, wherein the thruster unit comprises the roll control thruster of claim 1.

* * * * *